United States Patent Office 3,382,288
Patented May 7, 1968

3,382,288
ALKYLATION OF ADAMANTANE
HYDROCARBONS
Abraham Schneider, Overbrook Hills, Pa., assignor to
Sun Oil Company, Philadelphia, Pa., a corporation of
New Jersey
No Drawing. Filed Feb. 2, 1967, Ser. No. 613,443
17 Claims. (Cl. 260—666)

ABSTRACT OF THE DISCLOSURE

Adamantane hydrocarbons of the $C_{10}-C_{30}$ range having 1 to 4 open bridgehead positions are alkylated by reaction with aliphatic or cycloaliphatic olefins or alcohols of 2 to 30 carbon atoms using $H_2SO_4$ or HF of 90–100% strength as catalyst at a temperature in the range of $-20°$ C. to $100°$ C. When the alkylating agent is ethylene or ethyl alcohol, a temperature of 50–80° C. preferably is used. For $C_3$ and higher olefins or alcohols preferred temperatures are in the range of 0–50° C. During the reaction the adamantane nucleus stays intact and any alkyl groups attached thereto in the adamantane hydrocarbon feed remain at the original position. Alkylation occurs only at bridgehead positions of the nucleus and from 1 to 4 alkyl or cycloalkyl groups can be substituted if such bridgehead positions are open in the starting hydrocarbon. In some cases a minor but appreciable amount of product is obtained which has two adamantane nuclei joined by an alkylene group.

BACKGROUND OF THE INVENTION

This invention relates to the conversion of adamantane hydrocarbons of the $C_{10}-C_{30}$ range to alkylated adamantane derivatives. The starting adamantane hydrocarbons include adamantane itself and alkyladamantanes having 1 to 4 open bridgehead positions. The alkylation product has one or more saturated hydrocarbon substituents than the starting hydrocarbon, which substituents are attached to the adamantane nucleus at bridgehead positions.

The cage-like structure of the adamantane nucleus has been illustrated in several ways, of which the following is one example:

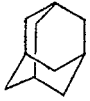

As can be seen, it consists of three condensed cyclohexane rings arranged so that there are four bridgehead carbon atoms which are equivalent to each other.

The preparation of methyl- and/or ethyl-substituted adamantanes by the isomerization of tricyclic naphthenes by means of an aluminum halide or $HF-BF_3$ catalyst has been described in several references including the following: Schneider United States Patent No. 3,128,316; Janoski et al. United States Patent No. 3,275,700; Schleyer et al., Tetrahedron Letters No. 9, pp. 305–309 (1961); and Schneider et al., JACS, vol. 86, pp. 5365–5367 (1964). The isomerization products can have the methyl and/or ethyl groups attached to the adamantane nucleus at either bridgehead or non-bridgehead positions or both, although completion of the isomerization reaction favors bridgehead substitution. Examples of alkyladamantanes made by such isomerization are methyladamantanes, dimethyladamantanes, ethyladamantanes, methylethyladamantanes, dimethylethyladamantanes and trimethyladamantanes.

Preparation of adamantane hydrocarbons having higher alkyl groups has been disclosed by Spengler et al., Erdöl und Kohle-Erdgas-Petrochemie, vol. 15, pp. 702–707 (1962). These authors used a Wurtz synthesis involving the reaction of 1-bromoadamantane with alkali metal alkyls to interchange the alkyl group for the bromine substituent. In this manner 1-n-butyladamantane and 1-n-hexyladamantane were prepared.

Recently Hoek et al., 85 (1966), Recueil, 1045–1053, have described a different route for the preparation of butyl-substituted adamantane. These authors point out that the seemingly obvious route of reacting 1-bromoadamantane with magnesium in a Grignard reaction turned out not to be suitable, giving 1,1-diadamantyl instead of the desired adamantayl Grignard reagent which could be converted to an alkyladamantane. Consequently a different and rather complicated procedure was developed, which involved reacting bromoadamantane with thiophene using $SnCl_4$ as catalyst in the presence of excess thiophene as solvent to produce adamantylthiophene and then hydrogenating the adamantylthiophene to yield butyl-substituted adamantanes.

SUMMARY OF THE INVENTION

The present invention provides a simplified procedure for adding one or more alkyl or cycloalkyl groups to adamantane or to higher adamantane hydrocarbons having one or more saturated hydrocarbon group or groups attached to the adamantane nucleus and at least one unsubstituted bridgehead carbon atom. The process involves alkylation of the adamantane hydrocarbon by means of an aliphatic or cycloaliphatic olefin or, alternatively, by means of an aliphatic or cycloaliphatic alcohol utilizing strong sulfuric or hydrofluoric acid as catalyst. From one to four saturate hydrocarbon substituents can be added depending upon the number of unsubstituted bridgehead positions available in the starting hydrocarbon. The substituent added can range from ethyl up to (say) a $C_{30}$ group, and the alkylating group or groups can be either alkyl or cycloalkyl.

The present process thus provides a means of preparing a wide variety of alkyladamantane products having numerous uses, particularly as basic materials in the preparation of polymers, special lubricants, pharmaceuticals and pesticides.

DESCRIPTION

The process of the invention comprises:
(a) Establishing an admixture of a saturated adamantane hydrocarbon of the $C_{10}-C_{30}$ range having 1 to 4 unsubstituted bridgehead carbon atoms, an alkylating agent having 2–30 carbon atoms selected from aliphatic and cycloaliphatic monoolefins and alcohols, and a mineral acid which is 90–100% sulfuric acid or 90–100% hydrofluoric acid;
(b) Reacting the mixture at an alkylating temperature in the range of $-20°$ to $100°$ C. whereby alkylation occurs;
(c) And separating from the reaction mixture an alkylated adamantane product having at least one more bridgehead alkyl or cycloalkyl substituent than the starting adamantane hydrocarbon.

The reaction that occurs in the process can be illustrated by considering, for example, the alkylation of 1,3-dimethyladamantane (for convenience, DMA) with 1- butanol, as follows (non-reacting hydrogen atoms being omitted for simplicity):

I

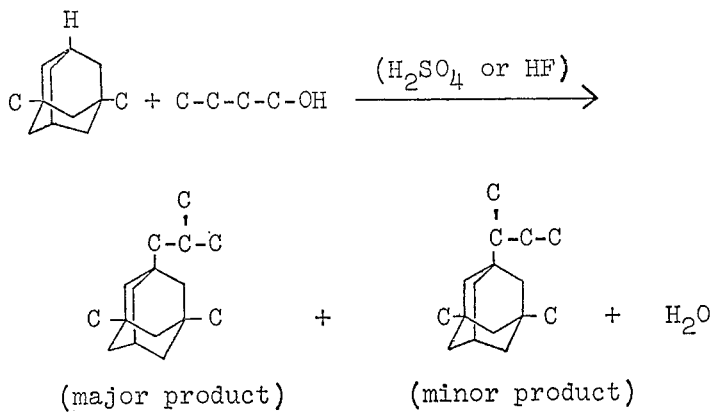

(major product)    (minor product)

From Equation I it can be seen that one of the bridgehead hydrogen atoms is replaced by a $C_4$ alkyl group obtained from the alkylating agent to give the alkylated product. Note that even though the butanol used is unbranched the alkyl substituents derived therefrom are branched. Both isobutyl DMA and sec-butyl DMA are obtained with the former being the major product component. Surprisingly, however, essentially no n-butyl DMA is produced.

Substitution in the above reaction of sec-butyl alcohol for 1-butanol will give essentially the same results. The use of t-butyl alcohol also gives substantially the same products in the same proportion insofar as the composition of the direct alkylation product is concerned. However, for the tertiary alcohol considerably more side reactions (e.g., disproportionation and alkylations involving the products thereof) generally occur, so that the yield of direct alkylation product is less than when normal or secondary butyl alcohol is employed as the alkylating agent.

Butene-1 or butene-2 in place or 1-butanol in the foregoing reaction will give substantially the same results except that water will not be formed. Isobutene will act like t-butyl alcohol, producing the same two direct alkylation products but also resulting in more side reactions, such as dimerization and disproportionation, and thus give a lower yield of the direct alkylation product.

When any higher aliphatic alcohols or olefins are used instead of butanol or butenes, analogous reactions occur and the resulting alkyl substituents attached to the adamantane nucleus are invariably branched even though the original alkylating agent may not have been. However, as the number of carbon atoms in the alkylating agent increases, the alkylation product becomes more complex since the number of possible isomers increases. As in the case of $C_4$ alcohols, higher aliphatic alcohols which are primary or secondary do not exhibit much side reaction. Tertiary alcohols, on the other hand, tend to undergo extensive side reaction which results in poor yields of the desired alkylation products and hence are generally not preferred. Similarly, branched olefins, either terminal or internal, also tend to give considerable side reaction and are not preferred. Unbranched olefins, terminal or internal, generally alkylate more efficiently than the branched olefins and thus give higher yields of the desired alkylated adamantane products.

It is characteristic of the present alkylation reaction that any $C_4$ or higher alkylating agent produces only branched substituents on the adamantane nucleus. On the other hand, alkyl substituents from alkylating agents of less than four carbon atoms (i.e., ethylene, ethanol, propylene, n-propanol and isopropanol) have no branching whatever. This is illustrated in Equations II and III, which show the reaction of DMA with isopropanol and propylene, respectively:

II

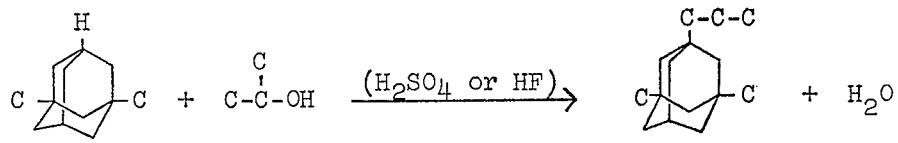

III

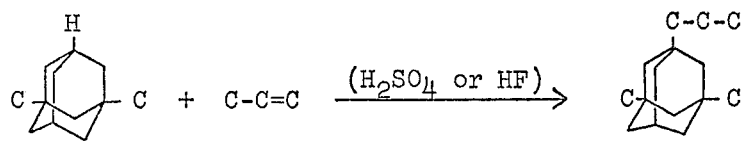

These equations show that the only monoalkylation product obtained for a $C_3$ alkylating agent is the n-propyl derivative, viz. 1-n-propyl-3,5-DMA, with alkylation occurring only at a bridgehead position.

When it is desired to introduce a cycloaliphatic group at a bridgehead position of the adamantane nucleus, either cycloaliphatic olefins or alcohols can be employed.

Equation IV shows an example of this for the alkylation of DMA with cyclopentanol:

IV.

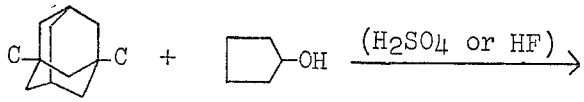 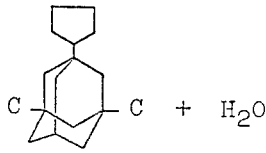

Cycloolefins alkylate in analogous fashion except, of course, that no water is formed. For most of the cyclic alkylating agents, the alkylation reaction proceeds with little complication by side reactions. However, in the case of $C_6$ cyclic olefins or alcohols such as cyclohexene, methylcyclopentene, dimethylcyclobutene, and the analogous $C_6$ cyclic alcohols, considerable side reaction does tend to occur due to dimerization of the alkylating agent and consequently lower yields of the direct alkylation product generally are obtained.

The foregoing equations illustrate the production of only monoalkylation products. However, more than one alkylation substituent can be added provided the requisite number of unsubstituted bridgehead positions are available in the starting adamantane hydrocarbon. In fact, the starting compound can be alkylated with as many alkyl or cycloalkyl groups as there are bridgehead positions available, although the alkylation reaction generally becomes less facile as alkylation groups are added. Thus, for adamantane from 1 to 4 substituents can be added by alkylation; for 1-methyladamantane from 1 to 3; for 2-methyladamantane from 1 to 4; for 1,3-DMA from 1 to 2; for the several DMA's in which one methyl is bridgehead and one non-bridgehead, from 1 to 3; for 2,4-DMA or other completely non-bridgehead substituted alkyladamantanes, from 1 to 4; etc.

When the starting adamantane hydrocarbon has two or more unsubstituted bridgehead positions and the alkylating agent is non-cyclic, generally a substantial amount of product is formed which has two adamantane nuclei. For example, in the alkylation of DMA with propylene, n-propanol or isopropanol, there is usually obtained a small amount of product having one or both of the following structures:

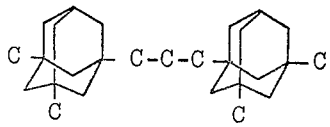 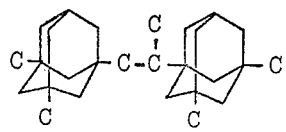

Likewise, with a $C_4$ aliphatic alkylating agent, a homologous product is obtained the major part of which appears to have the following structure:

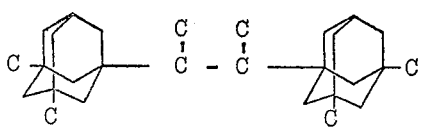

Isomers having between the nuclei a trimethylene bridge and one methyl group may also be obtained in small amounts. Analogous homologues are produced in minor amounts when higher aliphatic alkylating agents are used. When the starting adamantane hydrocarbon has only one unsubstituted bridgehead position, usually the amount of product having two adamantane nuclei is small and may not be appreciable.

It is characteristic of the present process that the reaction product has relatively few components as compared to the products from known alkylations, such as the alkylation of tertiary hydrogen-containing paraffins or cycloparaffins with olefins. For example, in the alkylation of methylcyclohexane with butene-1 by acid catalysts, a myriad of reaction products are obtained for the reason that numerous rearrangements of the primary alkylation product can occur. The reaction product is thus a complex mixture of hydrocarbons. In contrast, when 1,3-dimethyladamantane is alkylated with butene-1 according to the present invention, a relatively simple mixture of products results which is composed largely of the two isomers shown above in Equation I. Furthermore reactions of the present invention proceed more cleanly than in other alkylations and deterioration of the acid catalyst occurs at much lower rate.

The relative simplicity of the reaction products and the cleanliness of reaction in the present process are due to the following circumstances, as I have now discovered: (1) Regardless of the particular adamantane hydrocarbon used as starting material, the adamantane nucleus remains completely intact under conditions of the process. (2) All alkyl groups attached to the nucleus in the starting material remain at the original position throughout the reaction. (3) Alkylation occurs only at unsubstituted bridgehead positions of the adamantane nucleus. These features are unique and characteristic of alkylation reactions according to the present invention.

As previously stated the mineral acid for use in the process can be either sulfuric or hydrofluoric acid of 90–100% strength. Preferably sulfuric acid with a strength of 95–99% $H_2SO_4$ is used. When hydrofluoric acid is employed, a strength in the range of 94–100% HF is preferred. Strength as here used is calculated on a hydrocarbon-free basis and relates to the proportion of $H_2SO_4$ or HF to water present. Generally a volume excess of the acid relative to the adamantane hydrocarbon should be used and a volume ratio thereof in the range of 1:1 to 20:1 typically is employed.

A preferred manner of practicing the process comprises first mixing the starting adamantane hydrocarbon with the mineral acid to form an emulsion. In instances where the starting hydrocarbon would normally be a solid at the temperature to be used in the alkylation, as in the case of such hydrocarbons as adamantane, 1-methyladamantane, 2-methyladamantane, 1-n-butyladamantane, 1-n-decyladamantane, 1-n-eicosyladamantane, 1-cyclohexyladamantane and the like, the hydrocarbon should be dissolved in an inert solvent to prepare the emulsion. For this purpose any saturated hydrocarbon liquid which does not contain a tertiary hydrogen atom can be used. Examples of suitable inert solvents are n-pentane, neopentane, n-hexane, neohexane, n-heptane, cyclopentane, cyclohexane, cycloheptane and the like. After formation of the emulsion the mixture is maintained at a suitable alkylation temperature in the range of −20° to 100° C. and is agitated while slowly adding thereto the alkylating agent or a mixture of the alkylating agent with an additional amount of the starting adamantane hydrocarbon. Preferred reaction temperatures vary depending upon the type of alkylating agent used. In the case of ethylene or ethyl alcohol, the preferred temperature range is 50–80° C. For $C_3$ and higher unbranched olefins and non-tertiary alcohols a temperature in the range of 10° or 15° up to 50° C. is preferred, while for branched olefins and tertiary alcohols a temperature in the range of 0° up to 40° or 50° C. is preferred. Addition of the alkylating agent and agitation of the mixture are continued until the optimum degree of alkylation of the adamantane hydrocarbon has been attained. For monoalkylation less than one mole of alkylating agent per mole of adamantane hydrocarbon should be used, typically 0.2–0.5 mole/mole of adamantane hydrocarbon. On the other hand, when polyalkylation is desired, addition of the alkylating agent is continued until a suitable molar excess of the alkylating agent has been consumed. The use of higher temperatures within the specified ranges favors polyalkylation and also tends to increase the amount of product of the kind having two adamantane nuclei as depicted above.

After the reaction is completed, the reaction mixture is settled to separate the hydrocarbon and acid phases. The hydrocarbon phase can be washed to remove any residual acid and then distilled to separately recover products and any unreacted starting hydrocarbon therefrom.

An equivalent procedure for carrying out the alkylation comprises adding to the emulsion of adamantane hydrocarbon in acid an alkyl or cycloalkyl sulfate previously prepared or obtained in any suitable manner. This amounts to adding the olefin in the form of its sulfate and gives essentially the same results.

Still another procedure which can be used when the alkylating agent is an unbranched olefin or a primary or secondary alcohol involves first adding all of the alkylating agent to the acid at a relatively low temperature, e.g., 0° C., to form the alkyl or cycloalkyl sulfate, followed by adding all of the adamantane hydrocarbon to form an emulsion. With such alkylating agents substantial alkylation does not take place at 0° C. The temperature of the emulsion is then increased slowly while stirring the mixture and the alkylation reaction begins to proceed. For $C_4$ and higher secondary alcohols and internal olefins a substantial rate of alkylation is attained by the time a temperature of 15° C. is reached, whereas primary alcohols and terminal olefins (also $C_4$ or higher) generally require a somewhat higher temperature, e.g., 25° C. The mixture is stirred at such reaction temperature level until all of the alkylating agent has been consumed, and the mixture is then worked up to separate the alkylated adamantane product.

Alkylating agents which can be used in the present process include any $C_2$ to $C_{30}$ aliphatic or cycloaliphatic monoolefin or alcohol. The term "cycloaliphatic" as used herein is not intended to embrace adamantyl alcohols, such as 1-adamantanol or 1-hydroxy-3,5-DMA, which type of alcohol will not function as an alkylating agent under conditions of this process. Also, alkylating agents for the present purpose do not include di-functional aliphatic or cycloaliphatic materials such as diolefins, diols or compounds having both an olefinic double bond and a hydroxy group. As a general rule, olefins or alcohols having 10 or less carbon atoms are the most useful and are preferred in practicing the invention.

Illustrative examples of olefins which can be used in the process are the following: ethylene; propylene; butene-1; butene-2; isobutylene; octene-1; octene-4; 2,2,3-trimethyl-3-butene; diisobutylenes; dodecenes; docosenes; 5,5-diethyldecene-3; cyclobutene; cyclopentene; methylcyclohexenes; dimethylcyclohexenes; ethylcyclohexenes; vinylcyclohexane; ethylidenecyclohexane; 1,4-dicyclopentylbutene-2; 1,2-dicyclohexylethylene; 20-cyclohexyleicosene-1; $\Delta^9$-octalin; $\Delta^1$-octalin; $\Delta^2$-octalin; methyloctalins; dihydrodicyclopentadienes; and the like. Some examples of alcohols that can be used, other than those previously mentioned, are: amyl alcohols; 1-octanol; 2-octanol; 5-decanol; 2-ethyl-2-dodecanol; 1-methylcyclohexanol; cis or trans decalols with the hydroxy group in the 1-, 2- or 9-position; methyldecalols; 3-methylcyclohexanol; 1-cyclohexylcyclohexanol; dicyclopentylmethanol; 1,2-dicyclohexylethanol; tricyclohexylmethanol; and the like.

The alkylating agent in the presence of the strong sulfuric or hydrofluoric acid forms a carbonium ion which triggers the alkylation reaction. This occurs via the formation, in turn, of a carbonium ion from the adamantane hydrocarbon by abstraction of a bridgehead proton therefrom, and by providing an olefin species that reacts with the latter carbonium ion to give the alkylation product. Certain types of compounds other than olefins and alcohols also will give the same carbonium ion in the presence of the strong acid, and consequently are equivalent to the alkylating agents as above described for purposes of the present invention. As already mentioned, alkyl or cycloalkyl sulfates can be used. Other types of equivalent alkylating agents are alkyl or cycloalkyl ethers and esters. For example, the same butyl carbonium ion would be produced from dibutyl ether or from butyl acetate as from $C_4$ olefins, alcohols or sulfates, and hence the same alkylation products from these with adamantane hydrocarbons can be obtained.

The examples given below are specific illustrations of the invention. To facilitate reference to the examples, Table A presents a summary of the starting adamantane hydrocarbons and the alkylating agents used in these examples.

TABLE A

| Ex. No. | Adamantane Hydrocarbon | Alkylating Agent |
|---|---|---|
| 1 | 1,3-dimethyladamantane (DMA) | Ethanol. |
| 2 | do | Isopropanol. |
| 3 | do | n-Butyl alcohol. |
| 4 | do | Sec-butyl alcohol. |
| 5 | do | t-Butyl alcohol. |
| 6 | do | t-Amyl alcohol. |
| 7 | do | Cyclopentanol. |
| 8 | do | Cyclohexanol. |
| 9 | do | n-Hexene-1. |
| 10 | Adamantane | Cyclopentanol. |
| 11 | 1-ethyladamantane (EA) | n-Propanol. |
| 12 | 1-ethyl-3,5-dimethyladamantane (EDMA) | Isopropanol. |
| 13 | do | Cyclopentanol. |

Analyses of reaction products in the various runs were accomplished by vapor phase chromatography, IR and NMR spectroscopy.

Example 1

An emulsion of 2.50 g. of DMA in 20 ml. of concentrated sulfuric acid (96% $H_2SO_4$) was prepared and was stirred at 0° C. while adding over a period of 6 minutes a blend of 2.50 g. of DMA and 0.40 g. of ethanol. The final molar ratio of DMA to ethanol added was 3.5. The temperature of the mixture was then increased and the emulsion was stirred for times at various temperature levels as shown in Table I. Samples were taken at time intervals as shown and analyzed.

TABLE I

| Cut No. | 1 | 2 | 3 | 4 |
|---|---|---|---|---|
| Temperature, °C | 32 | 35–38 | 41 | 47–51 |
| Incremental time, min | 60 | 64 | 65 | 60 |
| Composition, wt. percent: | | | | |
| 1,3-DMA | 100 | 99.96 | 99.87 | 99.44 |
| Nonbridgehead DMA | | | | 0.09 |
| 1-ethyl-3,5-DMA | | 0.04 | 0.13 | 0.47 |

These results show that a very slow rate of alkylation was obtained at the temperatures here used and indicate that for alkylating with ethanol a temperature substantially above 50° C. should be employed. The acid layer recovered from the reaction mixture showed only slight discoloration and could be reused.

Example 2

An emulsion of 20 ml. of 96% $H_2SO_4$ and 5.00 g. of DMA was stirred at about 5° C. and a blend of 5.00 g. of DMA with 1.00 g. of isopropanol was added over 13 minutes time. Molar ratio of total DMA to isopropanol was 3.65. Stirring was continued with temperatures and times of sampling as shown in Table II.

TABLE II

| Cut No. | 1 | 2 |
|---|---|---|
| Temperature, °C | 5-23 | 35 |
| Incremental time, min | 27 | 30 |
| Composition, wt. percent: | | |
| DMA | 95.7 | 84.6 |
| 1-n-propyl-DMA | 3.8 | 12.6 |
| 1,3-di-n-propyl-DMA | 0.1 | 0.6 |
| 1-hexyl DMAs | Trace | 0.1 |
| di-DMA-propane | 0.5 | 2.0 |

As shown by the tabulated results, the mono-propylated product, viz. 1-n-propyl-3,5-DMA, was obtained as the main alkylation product. Also a substantial amount of of material (about 13 wt. percent of total alkylation products) containing two adamantane nuclei was produced. No discoloration of the acid layer occurred during the reaction.

Example 3

The procedure was similar to that of the preceding examples, using an emulsion of 20 ml. of 96% $H_2SO_4$ and 2.50 g. of DMA to which a blend of 2.50 g. of DMA of 1.00 g. of n-butanol was added at 5° C. over a period of 5 minutes. While being stirred the mixture was warmed quickly to 29° C. and stirred at that temperature for 275 minutes. The molar ratio of total DMA to n-butanol was 2.26. Composition of the final product is shown in Table III.

TABLE III

| | Wt. percent |
|---|---|
| DMA | 51.5 |
| 1-DMA-2-methylpropane | 28.7 |
| 1-DMA-1-methylpropane | 11.4 |
| 1,3-di-$C_4$-DMA I | 0.4 |
| 1,3-di-$C_4$-DMA II | 0.4 |
| 1-$C_8$ DMA's | 0.6 |
| Di-DMA-butanes | 7.2 |

The tabulated data show that the bulk of the alkylation product (82.5% on a DMA-free basis) was $C_4$-substituted DMA consisting of 2 isomers differing only in the position of branching of the $C_4$ substituent. There was also produced a substantial amount (14.8%) of product containing 2 adamantane nuclei between which was a group having 4 carbon atoms. The final acid layer from the reaction mixture was colored only slightly.

Example 4

The foregoing procedure was followed again by stirring an emulsion of 20 ml. of 96% $H_2SO_4$ and 5.0 g. of DMA and adding thereto a blend of 5.16 g. of DMA and 1.27 g. of sec-butyl alcohol at about 4° C. for over 5 minutes. The molar ratio of total DMA to alcohol was 3.6. The mixture was then stirred for a total of 46 minutes while slowly raising the temperature to about 32° C. Analysis of the final product is shown in Table IV. In addition to the product shown a small amount of low boiling paraffins was formed but is not included in the data given.

TABLE IV

| | Wt. percent |
|---|---|
| DMA | 73.3 |
| 1-DMA-2-methylpropane | 12.3 |
| 1-DMA-1-methylpropane | 6.7 |
| 1-$C_5$ DMA's | 0.1 |
| 1,3-di-$C_4$-DMA I | 1.4 |
| 1,3-di-$C_4$-DMA II | 2.4 |
| 1,3-di-$C_4$-DMA III | 1.3 |
| 1-$C_8$ DMA's | 0.4 |
| Di-DMA-butanes | 2.1 |

Comparison of this run with that of Example 3 shows that the use of secondary butyl alcohol results in somewhat more products than when n-butanol is employed. Nevertheless the $C_4$-substituted DMA constituted 71% of the toal alkylation product. The product containing 2 adamantane nuclei amounted to only about 8%. The final acid layer in this run was essentially colorless.

Example 5

An emulsion of 20 ml. of 96% $H_2SO_4$ and 5.0 g. of DMA was stirred and a blend of 5 g. of DMA and 1.40 g. of t-butyl alcohol was slowly added thereto at 3° C. over a period of 18 minutes. The molar ratio of total DMA to t-butyl alcohol was 3.25. The mixture was then stirred over 8 minutes at about 4° C. and Cut 1 was taken following which it was stirred 42 minutes more at a temperature of 25-30° C. and Cut 2 was then taken. Analyses of the products are shown in Table V.

TABLE V

| | Cut 1, Wt. percent | Cut 2, Wt. percent |
|---|---|---|
| DMA | 80.0 | 73.2 |
| 1-DMA-2-methylpropane | 10.9 | 15.6 |
| 1-DMA-1-methylpropane | 2.2 | 2.9 |
| 1-$C_5$ DMAs | 0.2 | 0.3 |
| 1-$C_6$ DMAs | 0.1 | 0.3 |
| 1-$C_7$ DMAs | 0.3 | 0.4 |
| 1-$C_8$ DMAs | 1.8 | 2.0 |
| Di-DMA-butanes | 4.5 | 5.3 |

In this case no dialkylation products were detected as in the case of n-butanol and sec-butyl alcohol in the two preceding examples. However small amounts of disproportionation products ($C_5$–$C_7$ DMA's) were found. The two $C_4$-substituted isomers constituted 69% of the total alkylation product, while the product containing 2 adamantane nuclei amounted to 19.8%.

Example 6

The emulsion was made from 20 ml. of 96% $H_2SO_4$ and 2.50 g. of DMA and a blend of 2.50 g. of DMA and 0.70 g. of t-amyl alcohol was added at 3° C. over a time of 13 minutes. After stirring for 8 more minutes at 3° C., Cut 1 was taken. The acid layer at this stage appeared pale green. The molar ratio of DMA to t-amyl alcohol was 3.84. The temperature was raised to 35° C. and the mixture was stirred for 30 minutes more and Cut 2 was taken. The final acid layer appeared lemon yellow.

TABLE VI

| | Cut 1, Wt. percent | Cut 2, Wt. percent |
|---|---|---|
| DMA | 89.4 | 83.9 |
| 1-DMA-2-methylpropane | 2.2 | 3.2 |
| 1-DMA-1-methylpropane | 0.6 | 0.9 |
| 1-$C_5$ DMA I [1] | 3.1 | 5.9 |
| 1-$C_5$ DMA II | 0.2 | 0.3 |
| 1-$C_6$ DMAs | 1.4 | 2.1 |
| 1-$C_7$+DMAs | 0.7 | 0.6 |
| Di-DMA $C_4$, $C_5$, $C_6$ | 2.5 | 3.2 |

[1] Indicated to be:

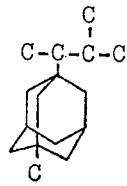

The results show that in addition to getting the two $C_5$-substituted DMA isomers substantial amounts of the $C_4$-, $C_6$- and $C_7+$ monoalkylated DMA products were obtained. Also a substantial amount of product containing 2 adamantane nuclei and joined by $C_4$, $C_5$ and $C_6$ groups was obtained, this material being represented by numerous peaks on the VPC chart. The $C_5$-monoalkylated DMA constituted about 39% of the total final alkylation product (DMA-free basis).

Example 7

To a stirred emulsion of 10 ml. of 96% $H_2SO_4$ and 2.50 g. of DMA was added a blend of 2.50 g. of DMA and 1.00 g. of cyclopentanol at 4-5° C. during 8 minutes time. The molar ratio of DMA to cyclopentanol was 2.63. The mixture was then stirred for 20 minutes while being warmed to 32° C. and Cut 1 was taken. The acid layer appeared orange at this time. The mixture was then stirred at 32° C. for 174 additional minutes and Cut 2 was taken. The final acid layer appeared brown.

TABLE VII

|  | Cut 1, Wt. percent | Cut 2, Wt. percent |
|---|---|---|
| Decalin (cis and trans) | 1.5 | 2.0 |
| DMA | 81.4 | 80.8 |
| $C_{15}$ product [1] | 0.3 | 0.5 |
| 1-cyclopentyl DMA | 15.0 | 14.6 |
| 1,3-dicyclopentyl DMA | 1.4 | 1.5 |
| Decalyl DMA [2] | 0.4 | 0.7 |

[1] Speculated to be $C_{15}$ tricyclic naphthene.
[2] Speculated structure.

The results show that cyclopentyl DMA constituted about 76% by weight of the total conversion products, while dicyclopentyl DMA amounted to about 8% thereof.

Example 8

The procedure in this case consisted of making an emulsion of 20 ml. of 96% $H_2SO_4$ and 2.50 g. of DMA and adding dropwise thereto 0.40 g. of cyclohexanol over a time of 15 minutes while holding the temperature at 0° C. The mixture was then warmed to 32° C. and stirred for 47 minutes to obtain Cut 1, followed by continued stirring for 69 minutes more at 32° C. to obtain Cut 2. The molar ratio of DMA to cyclohexanol was 3.82.

TABLE VIII

|  | Cut 1, Wt. percent | Cut 2, Wt. percent |
|---|---|---|
| $C_4, C_5, C_6$ Paraffins | Trace | Trace |
| Methylcyclopentane | 2.1 | 2.1 |
| Cyclohexane | 0.6 | 0.7 |
| Methylcyclohexane | 1.0 | 1.1 |
| Dimethylcyclohexane | 1.1 | 1.1 |
| $C_9$ Monocyclic naphthenes | 0.8 | 0.9 |
| $C_{10}$ Monocyclic naphthenes | 0.3 | 0.2 |
| DMA | 76.0 | 75.7 |
| Dimethyldecalins | 3.8 | 3.7 |
| 1-methylcyclopentyl DMA I [1] | 5.3 | 5.0 |
| 1-methylcyclopentyl DMA II | 0.4 | 0.4 |
| 1-cyclohexyl DMA | 7.0 | 7.1 |
| Dimethyldecalin-DMA [2] | 1.1 | 1.2 |
| Di-DMA-$C_6$ Monocyclic naphthenes [2] | 0.7 | 0.7 |

[1] Indicated to be:

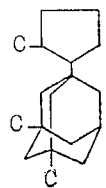

[2] Speculative structures.

As indicated by the data appreciable amounts of $C_6$–$C_{10}$ monocyclic naphthenes and also dimethyldecalins were produced in this reaction. The monosubstituted DMA alkylation product consisted of both 1-cyclohexyl-DMA and 1-methylcyclopentyl isomers, the latter being obtained as two VPC peaks. The total $C_6$-alkylated DMA product is 87% of the total material boiling above DMA and containing adamantane nuclei.

Example 9

An emulsion of 2.50 g. of DMA and 20 ml. of 96% $H_2SO_4$ was prepared and then a blend of 2.50 g. of DMA and 1.00 g. hexene-1 was added over 17 minutes with the temperature being held at about 3° C. while the mixture was being stirred. The molar ratio of total DMA to hexene-1 was 2.56. The temperature was then increased to 28° C. and the mixture was stirred for 30 minutes more. Composition of the hydrocarbon product is shown in Table IX.

TABLE IX

|  | Wt. percent |
|---|---|
| $C_4$–$C_7$ paraffins [1] | 2.8 |
| DMA | 65.1 |
| 1-$C_6$ DMA's | 27.7 |
| 1,3-Di$C_6$ DMA's | 2.6 |
| Di-DMA-$C_6$ paraffin | 1.4 |

[1] Mainly $C_6$ paraffins.

Mono-$C_6$-alkylated DMA's and di-$C_6$-alkylated DMA's constituted, respectively, about 80% and 8% of the total conversion products.

Example 10

In this example adamantane was the starting hydrocarbon and cyclohexane was used as inert solvent therefore. A mixture of 20 ml. of 96% $H_2SO_4$ with 2.0 g. of adamantane and 3 ml. of cyclohexane was prepared and its temperature brought to about 3° C. Under these conditions only part of the adamantane was in solution in the cyclohexane and the remainder was in the form of suspended crystals. A blend of 1.27 g. of cyclopentanol and 4 ml. of cyclohexane was added to the stirred mixture at 3° C. over a time of 6 minutes, following which the mixture was stirred for 40 minutes during which time its temperature was brought to 26° C. and Cut 1 was taken. The mixture was then stirred at 28° C. for 52 minutes more and Cut 2 was taken, following which the temperature was reduced to 0° C. and 1.27 g. of additional cyclopentanol were added during an 8-minute period. Finally the temperature was raised to 26° C., the mixture was stirred for 60 minutes and Cut 3 was then taken.

TABLE X

|  | Cut 1, Wt. Percent | Cut 2, Wt. Percent | Cut 3, Wt. Percent |
|---|---|---|---|
| Decalin | 4.2 | 5.4 | 6.9 |
| Adamantane (A) | 72.8 | 62.5 | 24.5 |
| Methyldecalins | 2.7 | 2.8 | 2.7 |
| 1-cyclopentyl-A | 12.0 | 21.8 | 49.0 |
| 1,3-dicyclopentyl-A | 7.1 | 6.4 | 14.9 |
| 1,3,5-tricyclopentyl-A | 1.2 | 1.1 | 2.1 |

The results show that, based on all conversion products, the mono-, di- and tricyclopentyl substituted products amounted to 65%, 20% and 3% respectively. No tetraalkylated product was found. However such product could have been made by continuing the alkylation with more cyclopentanol.

Example 11

The starting hydrocarbon in this case was 1-ethyladamantane. To an emulsion of 2.50 g. of this hydrocarbon in 20 ml. of 96% $H_2SO_4$ was added a blend of 0.59 g. of n-propanol and 2.00 g. of 1-ethyladamantane at 2° C. over a time of 5 minutes. The molar ratio of total 1-ethyladamantane to n-propanol was 2.7. The temperature was held at levels indicated in Table XI and the mixture was stirred for various times with a total of 4 cuts being taken as designated.

TABLE XI

| Cut No | 1 | 2 | 3 | 4 |
|---|---|---|---|---|
| Temperature, ° C | 0 | 37–41 | 36–39 | 36–40 |
| Incremental time, min | 60 | 34 | 26 | 130 |
| Compostion, wt. percent: |  |  |  |  |
| Propane |  | Trace | Trace | Trace |
| 1-ethyladamantane (EA) | 100 | 83.1 | 71.9 | 65.9 |
| 1-ethyl-3-propyl-A |  | 14.1 | 21.2 | 26.4 |
| 1-ethyl-3,5-di-n-propyl-A |  | 1.3 | 1.8 | 2.0 |
| 1-ethyl-3,5,7-tri-n-propyl-A |  | Trace | Trace | Trace |
| Di-EA-propane |  | 1.5 | 4.0 | 4.8 |
| Unknown I |  | 0.3 | 1.0 | 1.0 |
| Unknown II |  | Trace | 0.09 | 0.1 |

In the final mixture the mono-propyl and di-propyl substituted products constituted, respectively, 74% and 6% of the total product boiling above EA. Only a trace of the tri-propyl substituted product was obtained. A substantial amount (14%) of product containing two ethyladamantane groups joined by a $C_3$ group was obtained.

Example 12

The starting adamantane hydrocarbon in this case was 1-ethyl-3,5-dimethyladamantane (EDMA) and hence had only one open bridgehead position. An emulsion of 20 ml. of 96% $H_2SO_4$ and 2.50 g. of EDMA was held at 3° C. while stirring and a blend of 0.56 g. of isopropanol and 2.50 g. of EDMA was added while stirring for 12 minutes. The molar ratio of total EDMA to isopropanol was 2.79. The mixture was then stirred at temperatures shown in Table XII and 3 cuts were taken at times as indicated.

TABLE XII

| Cut No | 1 | 2 | 3 |
|---|---|---|---|
| Temperature, ° C | 28 | 28 | 39-40 |
| Incremental time, min | 48 | 60 | 60 |
| Composition, wt. percent: | | | |
| Ethyldimethyladamantane (EDMA) | 99.3 | 97.3 | 90.2 |
| 1-n-propyl-EDMA | 0.7 | 2.4 | 8.3 |
| 1-hexyl-EDMA | Trace | 0.1 | 0.41 |
| Unknown I | | 0.2 | 0.9 |
| Unknown II | | 0.1 | 0.1 |

The data show that the mono-bridgehead starting material alkylated slowly under these conditions and that the bulk of the alkylated product was 1-n-propyl-3-ethyl-5,7-DMA. A small amount of hexyl-substituted EDMA was produced as well as small amounts of other products not identified.

Example 13

An emulsion of 20 ml. of 96% $H_2SO_4$ and 2.50 g. of EDMA was stirred at 3° C. and a blend of 0.80 g. of cyclopentanol and 2.50 g. of EDMA was added during a time of 10 minutes. The molar ratio of EDMA to cyclopentanol was 2.80. The mixture was then stirred at 28° C. for 95 minutes additionally.

TABLE XIII

| | Wt. percent |
|---|---|
| Cyclopentane | 0.9 |
| Trans-decalin | 1.3 |
| Cis-decalin | Trace |
| Ethyldimethyladamantane (EDMA) | 89.9 |
| $C_{15}$ naphthenes [1] | 0.8 |
| 1-cyclopentyl-EDMA | 7.2 |

[1] Speculated to be saturated cyclopentene trimer.

The results show that 90% by weight of the product boiling above EDMA was 1-cyclopentyl-EDMA.

When hydrofluoric acid is substituted for sulfuric acid as the alkylation catalyst, results substantially like those illustrated in the foregoing examples are obtained. Also the use of any of the other alkylating agents as herein defined for the specific alkylating agents shown in the examples give substantially analogous results.

The alkylated adamantane products that can be made in accordance with the present invention have utility as starting material from which various types of functional derivatives can be prepared, such as monools and diols, and mono- and di-acids, amines, isocyanates or haloadamantanes. Such derivatives can be employed for preparing various kinds of useful products such as special lubricants, solid polymers, pharmaceuticals and pesticides. The properties of each of these kinds of products will vary depending upon the saturated hydrocarbon group or groups that are attached to the adamantane nucleus, and hence the invention provides a means of systematically varying the properties of these products. For example, Duling and Schneider application United States Ser. No. 531,059, filed Mar. 2, 1966, describes special ester-type lubricants having unusually good thermal stability made from alkyladamantane monools and aliphatic diacids or diacid chlorides or from alkyladamantane diols and aliphatic monoacids or monoacid chlorides. Various properties of these lubricants, e.g., their hydrocarbon solubility, can be varied by varying the size and/or number of alkyl substituents on the aromatic nuclei in accordance with the present invention. Likewise, solid polymers containing adamantane nuclei, such as the polyurethanes described in application United States Ser. No. 525,290, filed Feb. 7, 1966, or polyamides as described in application United States Ser. No. 542,229, filed Apr. 13, 1966, can be made with varying properties by utilizing alkylated adamantanes made by the present invention for preparing the monomers.

In the pharmaceutical area the desirability of being able to prepare alkyladamantanes for conversion to derivatives having various physiological activities has been indicated by Hoek et al. in the article above cited. The same is true also with respect to the pesticide or crop protection area. One example of this is illustrated in my copending application United States Ser. No. 597,885, filed Nov. 30, 1966, wherein an unpredictable activity of 1-hydroxy-3,5-dimethyl-7-ethyladamantane against a plant virus is shown. Specifically, tests showed that this particular alkyladamantanol was effective as an eradicant for Tobacco Mosaic Virus. This compound can be made from 1,3-dimethyladamantane (obtained, for example, as shown in Schneider United States Patent No. 3,128,-216) by first alkylating the same by means of ethylene or ethanol in accordance with the present invention and then converting the resulting 1,3-dimethyl-5-ethyl-adamantane to the bridgehead monool by means of chromic acid in aqueous acetic acid or by air oxidation in the presence of a metal salt oxidation catalyst.

I claim:

1. Process for converting adamantane hydrocarbons to alkylated adamantane derivatives which comprises:
    (a) establishing an admixture of a saturated adamantane hydrocarbon of the $C_{10}$–$C_{30}$ range having 1 to 4 unsubstituted bridgehead carbon atoms, an alkylating agent having 2–30 carbon atoms selected from aliphatic and cycloaliphatic monoolefins and alcohols, and a mineral acid selected from the group consisting of 90–100% sulfuric acid and 90–100% hydrofluoric acid;
    (b) reacting the mixture at an alkylating temperature in the range of −20° to 100° C. whereby alkylation occurs;
    (c) and separating from the reaction mixture an alkylated adamantane product having at least one more bridgehead alkyl or cycloalkyl substituent than the starting adamantane hydrocarbon.

2. Process according to claim 1 wherein said alkylating agent is a monoolefin having at least three carbon atoms and the temperature is in the range of 0–50° C.

3. Process according to claim 2 wherein said acid is sulfuric acid.

4. Process according to claim 1 wherein said alkylating agent is ethylene or ethanol and the temperature is in the range of 50–100° C.

5. Process according to claim 4 wherein said acid is sulfuric acid.

6. Process according to claim 1 wherein said alkylating agent is an alcohol having at least three carbon atoms and the temperature is in the range of 0–50° C.

7. Process according to claim 6 wherein said acid is sulfuric acid.

8. Process according to claim 1 wherein the starting adamantane hydrocarbon is selected from the group consisting of adamantane, methyladamantanes, dimethyladamantanes, ethyladamantanes, methylethyladamantanes, dimethylethyladamantanes and trimethyladamantanes.

9. Process according to claim 8 wherein said starting adamantane hydrocarbon is 1,3-dimethyladamantane.

10. Process according to claim 9 wherein said alkylating agent is a $C_3$–$C_{10}$ monoolefin and the temperature is in the range of 0–50° C.

11. Process according to claim 10 wherein said acid is 95–99% sulfuric acid.

12. Process according to claim 8 wherein said alkylating agent is a $C_3$-$C_{10}$ alcohol and the temperature is in the range of 0-50° C.

13. Process according to claim 12 wherein said acid is 95-99% sulfuric acid.

14. Process according to claim 8 wherein said alkylating agent is ethylene or ethanol and the temperature is in the range of 50-100° C.

15. Process according to claim 14 wherein said acid is 95-99% sulfuric acid.

16. Process according to claim 1 wherein said alkylating agent is a straight chain monoolefin or alcohol having at least four carbon atoms and said alkylated adamantane product has alkyl substituents derived therefrom which are substantially all branched.

17. Process according to claim 1 wherein establishing and reacting said mixture are carried out by first forming an emulsion of said adamantane hydrocarbon and mineral acid, and agitating the emulsion at an alkylating temperature above 0° C. while adding thereto said alkylating agent.

References Cited

UNITED STATES PATENTS

| | | | |
|---|---|---|---|
| 3,128,316 | 4/1964 | Schneider | 260—666 |
| 3,275,700 | 9/1966 | Janoski et al. | 260—666 |
| 2,334,099 | 11/1943 | Ipatieff et al. | 260—666 |
| 2,852,581 | 9/1958 | Stiles | 260—666 |
| 2,859,259 | 11/1958 | Stiles | 260—666 |
| 2,820,835 | 1/1958 | Peters et al. | 260—666 |
| 2,340,557 | 2/1944 | Pines et al. | 260—666 |

OTHER REFERENCES

Schleyer et al.: Tetrahedron Letters, No. 9, pp. 305-309, 1961.

Schneider et al.: J. Amer. Chem. Soc., 86, pp. 5365-7, 1964.

Fort et al.: Chem. Rev., 64, No. 3, pp. 277-300, 1964.

DELBERT E. GANTZ, *Primary Examiner.*

V. O'KEEFE, *Assistant Examiner.*